(12) United States Patent
Abe

(10) Patent No.: US 6,731,194 B1
(45) Date of Patent: May 4, 2004

(54) ROTARY SENSOR IN WHICH SENSOR ROTATION SHAFT IS PREVENTED FROM BECOMING ECCENTRIC

(75) Inventor: Hideki Abe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 268 days.

(21) Appl. No.: 09/599,350

(22) Filed: Jun. 20, 2000

(30) Foreign Application Priority Data

Jun. 21, 1999 (JP) .......................................... 11-174336

(51) Int. Cl.⁷ .............................................. H01C 10/32
(52) U.S. Cl. ...................................... 338/167; 338/175
(58) Field of Search ................................. 338/167, 170, 338/175

(56) References Cited

U.S. PATENT DOCUMENTS

| | | | | |
|---|---|---|---|---|
| 3,533,043 A | * | 10/1970 | Spaude ........................ | 338/167 |
| 3,576,512 A | * | 4/1971 | Michik ........................ | 338/174 |
| 3,757,267 A | * | 9/1973 | Gerstmeier .................. | 338/174 |
| 3,761,751 A | * | 9/1973 | Fink et al. .................... | 310/168 |
| 3,883,839 A | * | 5/1975 | Barrett et al. ................ | 338/116 |
| 4,812,803 A | * | 3/1989 | Hochholzer ................. | 338/175 |
| 5,144,277 A | | 9/1992 | Ishihara et al. | |
| 5,345,215 A | | 9/1994 | Okumura et al. | |
| 5,491,462 A | * | 2/1996 | Cecchi et al. ................ | 338/128 |
| 5,539,373 A | * | 7/1996 | Pfaffenberger et al. ..... | 338/196 |
| 6,005,473 A | * | 12/1999 | Ishihara ....................... | 338/167 |

FOREIGN PATENT DOCUMENTS

JP          50-121246          3/1949

* cited by examiner

Primary Examiner—Karl D. Easthom

(57) ABSTRACT

Disclosed is a highly reliable rotary sensor capable of preventing radial eccentricity of the rotation shaft and performing correct detection. The rotary sensor includes a rotating member having a rotation shaft, a rotation detecting device for detecting the rotation of the rotating member, a bearing having a shaft hole into which the rotation shaft is inserted and which rotatably supports the rotation shaft integrally with the rotating member, and a biasing device for imparting a biasing force in a thrust direction to the rotation shaft, wherein there is formed in the periphery of one end portion of the shaft hole a beveled portion inclined so as to be outwardly flared in the radial direction A of the shaft hole, and wherein the rotating member 11 is provided with a tapered surface corresponding to the beveled portion, the tapered surface being held in press contact with the beveled portion by the biasing force of the biasing device.

6 Claims, 17 Drawing Sheets

ROTARY SENSOR IN WHICH SENSOR ROTATION SHAFT IS PREVENTED FROM BECOMING ECCENTRIC

BACKGROUND OF THE INVENTION

1. Field of the Invention

The present invention relates to a rotary sensor, for example, a throttle position sensor mounted in a vehicle and used for the purpose of detecting the position of the throttle valve according to the amount of pushing the gas pedal and, in particular, to a rotation shaft bearing structure which prevents the sensor rotation shaft from becoming eccentric.

2. Description of the Related Art

FIGS. 30 and 31 illustrate a conventional rotary sensor of this type. The conventional rotary sensor comprises a cup-shaped housing 31 formed of synthetic resin. An annular wall portion 31 is integrally formed with a cylindrical external connection portion 33, and three lead-through terminals 34 (only one of which is shown) are mounted by insert molding. The interior of the annular wall 32 constitutes an accommodating portion 35, the end portions of the three lead-through terminals 34 being arranged in the accommodating portion 35 and the external connection portion 33.

In the bottom wall portion 36 of the housing 31, a metal bearing 37 is mounted by insert molding, and a plate-like rotating member accommodated in the accommodating portion 35 and formed of an insulating resin has a rotation shaft 38a rotatably supported by the bearing 37, forked sliders 39 formed of a conductive material being supported by the rotating member 38. And, to the forward end portion of the rotation shaft 38a, there is firmly attached a lever member 40 outside the housing 31, and due to this lever member 40, the rotation shaft 38a is prevented from being detached.

Further, on the inner peripheral surface of the annular wall portion 32 of the housing 31, there is formed a step portion 32a, and a circuit board 41 formed of synthetic resin or ceramic abuts this step portion so as to be fixed in the accommodating portion 35 such that it is opposed to the rotating member 38. And, on the surface of the circuit board 41, there are formed by printing a resistor pattern 42 which is arcuate around the rotation shaft 38a and a collector pattern 43, and the sliders 39 are in contact with them to establish electrical connection between the resistor pattern 42 and the collector pattern 43. Further, eyelet-like terminals 44 (only one of which is shown) are fixed to the circuit board 41 at both ends of the resistor pattern 42 and one end of the collector pattern 43, and one end of each of the three lead-through terminal 34 is soldered to the forward end portion of each of them.

Further, in the bottom wall portion 36 of the housing 31, there is formed on the opposite side of the accommodating portion 35 a recess 45 so as to be opposed to the lever member 40, and a coil spring 46 is accommodated in the recess 45 such that a part of the bearing 37 is accommodated in the winding portion thereof, the free ends 46a and 46b of the coil spring 46 being engaged with the recess 45 and the lever member 40.

Further, a cover 47 formed of synthetic resin is fitted into the opening 35a of the housing 31 on the back side of the circuit board 41, and this cover 47 is supported by the housing 31 by crushing the periphery of the opening 35a of the housing 31 by heat caulking, thereby enclosing the interior of the accommodating portion 35.

In the rotary sensor, constructed as described above, the lever member 40 is connected through a drive pin 49a to a rotary disc 49 fastened to a drive shaft 48, which rotates by a predetermined angle in accordance with the position or opening angle of the throttle valve of an internal combustion engine (not shown), a predetermined voltage being applied to both ends of the resistor pattern 42 through a connector (not shown) fitted into the external connection portion 33, the lead-through terminals 34 and the terminals 44.

And, when the rotation of the drive shaft 48 is transmitted to the lever member 40 through the rotary disc 49 and the drive pin 49a, the rotation shaft 38a and the rotating member 38 rotate integrally with the lever member 40, and, with that, the sliders 39 slide on the resistor pattern 42 and the collector pattern 43. As a result, a voltage according to the position or opening angle of the throttle valve is generated in the terminal 44 fastened to one end portion of the collector pattern 43. This voltage is output to the exterior of the sensor through the connector, and used as a throttle valve position signal for controlling an internal combustion engine or the like.

As shown in FIG. 31, in the above-described conventional rotary sensor, a little clearance t is provided between the rotation shaft 38a and the inner peripheral surface of the bearing 37 so that the rotation shaft 38 can rotate. Thus, when the rotation shaft 38a rotates in a condition in which it s radially eccentric (in the directions of the arrows A), the rotation of the rotating member 38 as a result of the rotation of the rotation shaft 38a causes the rotating member 38 to rotate in an eccentric state, so that the sliders 39 are deviated from the regular circular paths. As a result, the linearity characteristics of the throttle posit on signal (linear change in the output voltage according to the rotation of the lever member 40) deteriorate. Further, hysteresis is generated in the throttle valve position signal, making it impossible to correctly detect the position or opening angle of the throttle valve.

SUMMARY OF THE INVENTION

The present invention has been made in view of the above problem in the prior art. Accordingly, it is an object of the present invention to provide a highly reliable rotary sensor in which radial eccentricity of the rotation shaft is prevented, making it possible to perform correct detection.

To achieve the above object, there is provided, in accordance with the present invention, a rotary sensor comprising a rotating member having a rotation shaft, rotation detecting means for detecting the rotation of the rotating member, a bearing having a shaft hole into which the rotation shaft is inserted and which rotatably supports the rotation shaft integrally with the rotating member, and biasing means for imparting a biasing force in a thrust direction to the rotation shaft, wherein there is formed in the periphery of one end portion of the shaft hole a beveled portion inclined so as to be outwardly flared in the radial direction of the shaft hole, and wherein the rotating member is provided with a tapered surface corresponding to the beveled portion, the tapered surface being held in press contact with the beveled portion by the biasing force.

In the above construction, there are provided a housing having an accommodating portion accommodating the rotation detecting means and a lever member adapted to rotate integrally with the rotation shaft, the bearing being provided in the bottom wall portion of the housing, the accommodating portion communicating with the exterior of the housing by the bearing, the lever member being arranged on the opposite side of the accommodating portion, the bottom wall portion having a recess accommodating the biasing means on the opposite side of the accommodating portion, the biasing means biasing the rotation shaft through the lever member.

Further, in the above construction, the rotating member is accommodated in the accommodating portion, and wherein, in the radial direction of the hole portion, on the outside of the beveled portion of the bearing and the tapered surface of the rotating member, the biasing member biases the lever member such that it is separated from the accommodating portion, thereby bringing the beveled portion into press contact with the tapered surface in the accommodating portion.

Further, in the above construction, the biasing means is formed by a single coil spring, the bearing being accommodated in the winding portion of the coil spring.

Further, in the above construction, the free ends of the coil spring are engaged with the recess and the lever member, the lever member being automatically restored to the initial position with the rotating member by the elastic force of the coil spring.

DESCRIPTION OF THE PREFERRED EMBODIMENT

Figure 1:
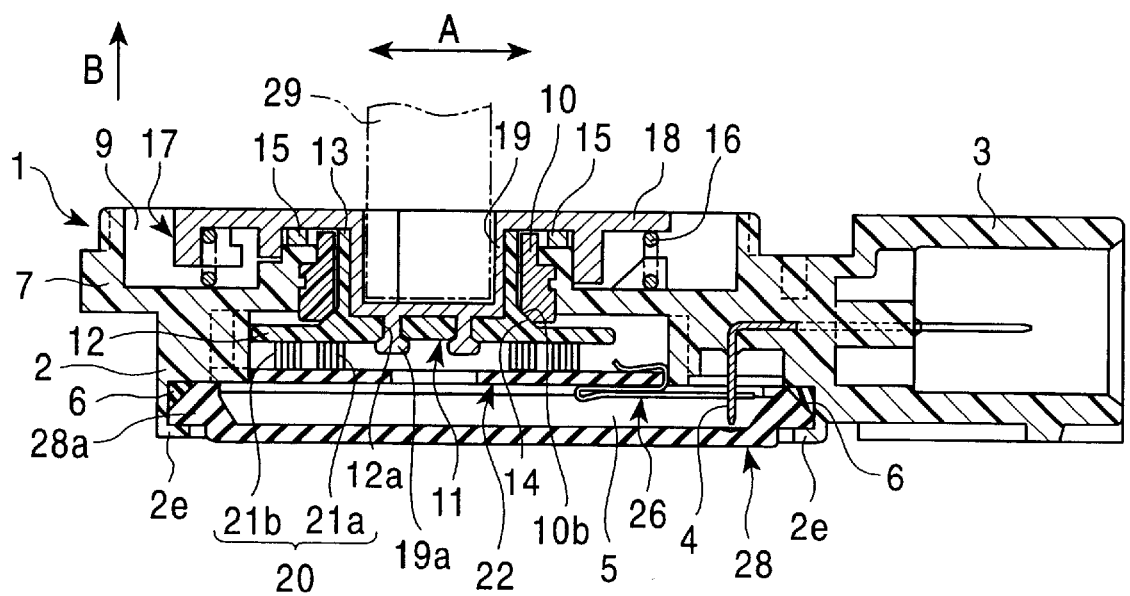
FIG. 1 is a vertical sectional view of a rotary sensor according to the present invention.

A rotary sensor according to an embodiment of the present invention will now be described with reference to FIGS. 1 through 29.

The rotary sensor mainly comprises a housing 1 having an accommodating portion 5, a bearing 10 mounted to the housing 1, a rotating member 11 having a rotation shaft 13 rotably supported by the bearing 10, a lever member 17 connected to the rotation shaft 13, a wave washer 15 serving as biasing means for imparting a biasing force in a thrust direction to the rotation shaft 13, a coil spring 16 for automatically restoring the lever member 17 to the initial position, rotation detecting means 20 for detecting the rotation of the rotating member 11, and a cover 28 for closing the accommodating portion 5 of the housing 1.

Figure 7:
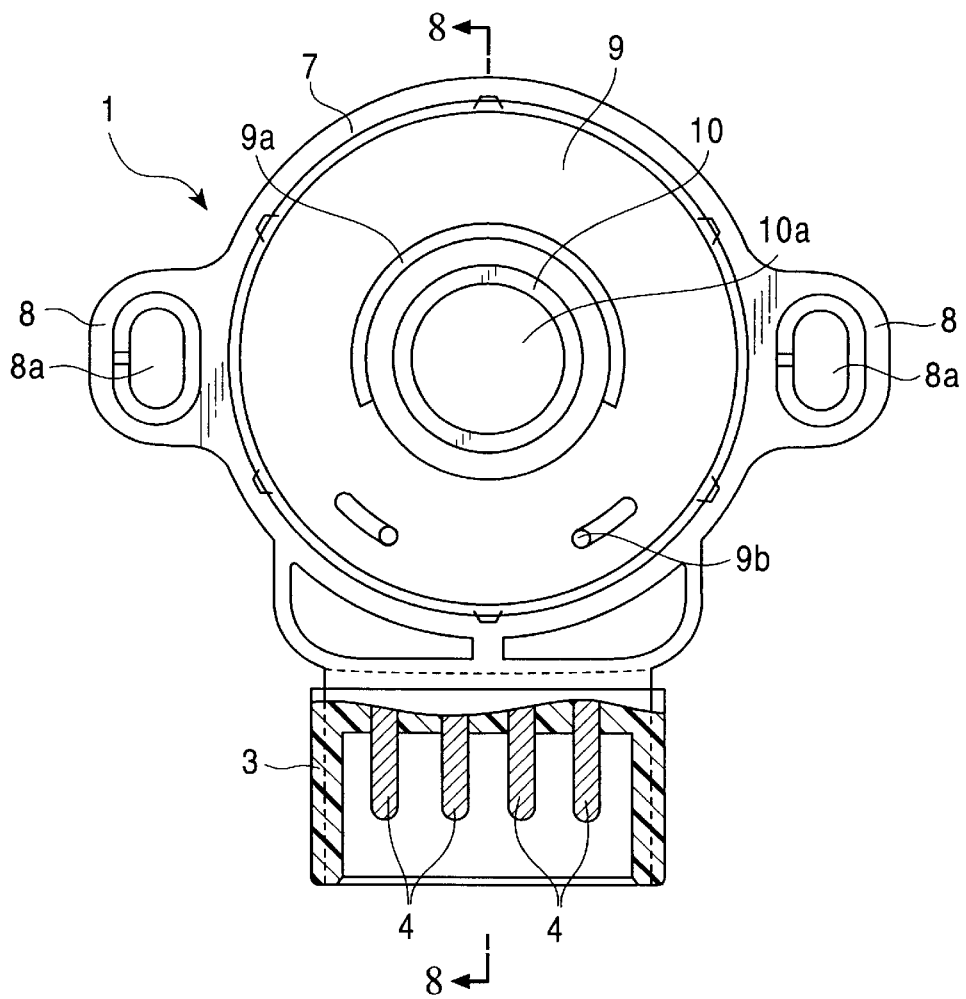
FIG. 7 is a plan view of the housing of the rotary sensor of the present invention.
Figure 8:
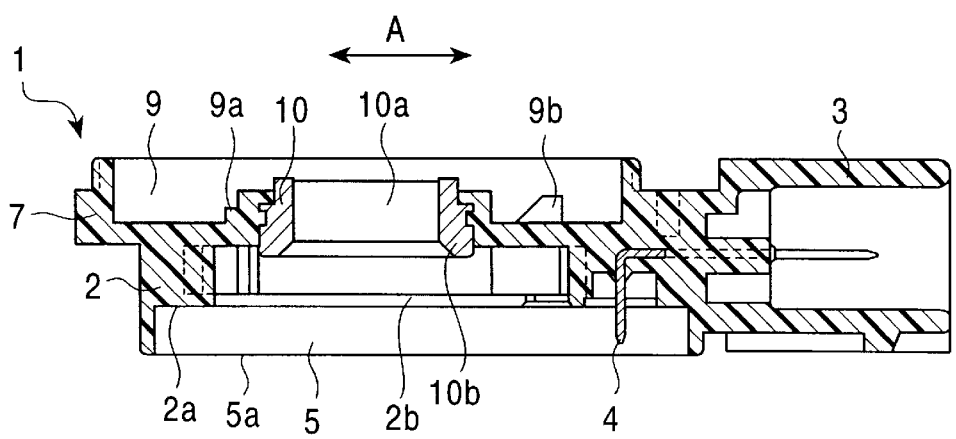
FIG. 8 is a sectional view taken along the line 8—8 of FIG. 7.
Figure 9:
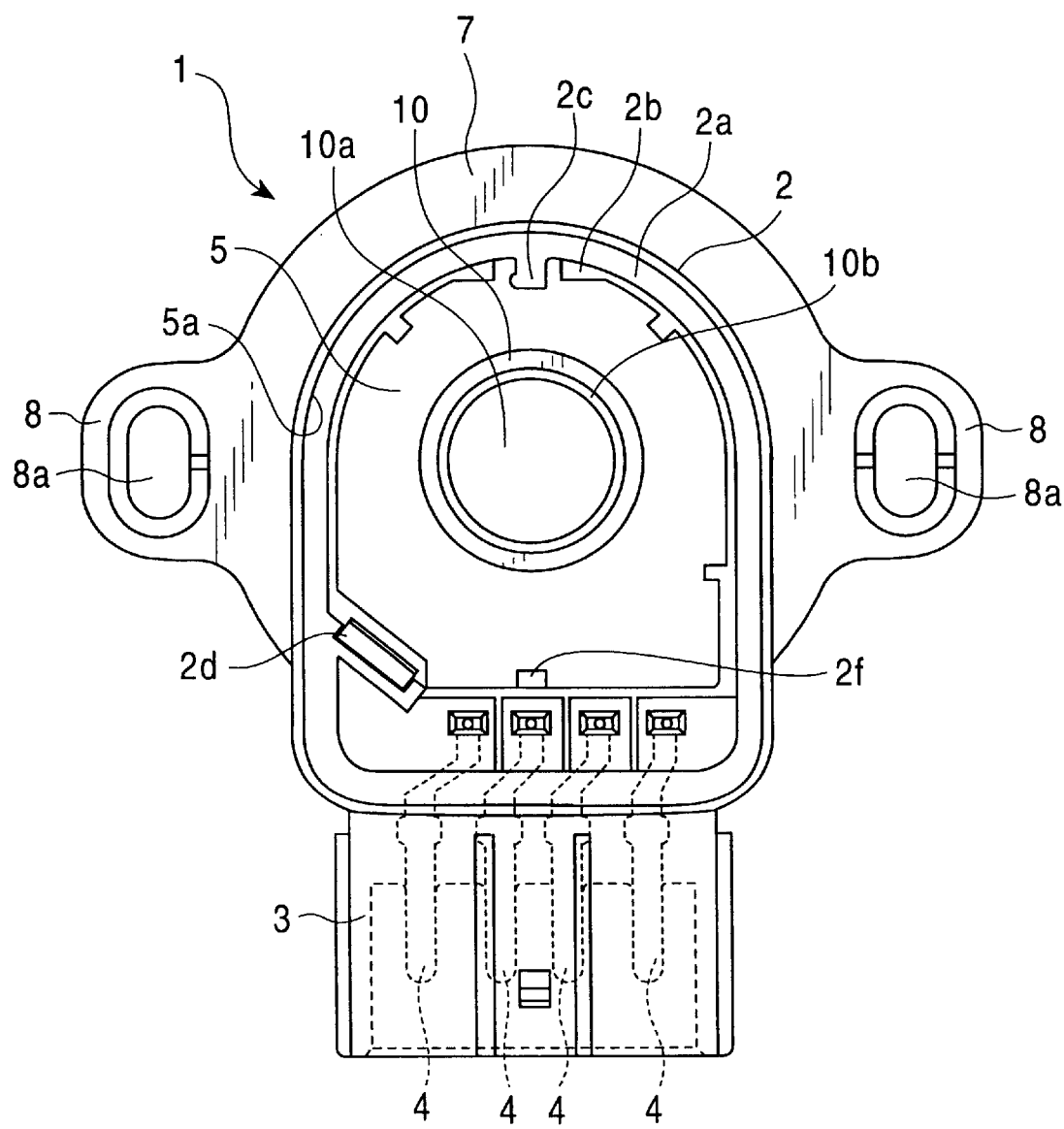
FIG. 9 is a back side view of the housing of the rotary sensor of the present invention.

The housing 1 is formed in a cup-like configuration of an insulating synthetic resin, such as PBT (polybutylene terephthalate). As shown in FIGS. 7 through 9, a cylindrical external connection portion 3 is integrally formed with an annular wall portion 2, and four lead-through terminals 4 are mounted by insert molding, the interior of the annular wall portion 2 constituting the accommodating portion 5 having an opening 5, the ends of the four lead-through terminal being arranged in the accommodating portion 5 and the external connection portion 3. And, in the inner wall surface of the annular wall portion 2, there is formed an annular step portion 2a on which an O-ring 6 is placed along the periphery of the opening 5a, and on the inner side of the annular step portion 2a, there is formed a receiving surface 2b for receiving a circuit board 22, an engagement protrusion 2c to be engaged with the circuit board 22, a rectangular hole 2d into which a support plate spring 27 described below is inserted, and an engagement protrusion 2f opposed to the engagement protrusion 2c.

In the bottom wall portion 7 of the housing 1, a mounting portion 8 having a pair of mounting holes 8a is integrally formed, and a circular recess 9 is provided on the opposite side of the accommodating portion 5. A bearing 10 having a circular shaft hole 10a is mounted to the central portion of the recess 9 by insert molding, the shaft hole 10 allowing the accommodating portion 5 to communicate with the exterior of the housing 1. And, in the periphery of one end of the shaft hole 10a, in the radial direction of the shaft hole 10a (the direction of the arrow A in FIG. 8), there is formed a beveled portion 10b inclined by approximately 45 degrees over the entire periphery so as to be outwardly flared to form a conical surface and so as to be liner in the vertical cross section depicted at FIG. 1. Further, in the recess 9, an arcuate stopper protrusion 9a is formed so as to be concentric with the bearing 10, and there is provided an engagement protrusion 9b to be engaged with the coil spring 16.

Figure 3:
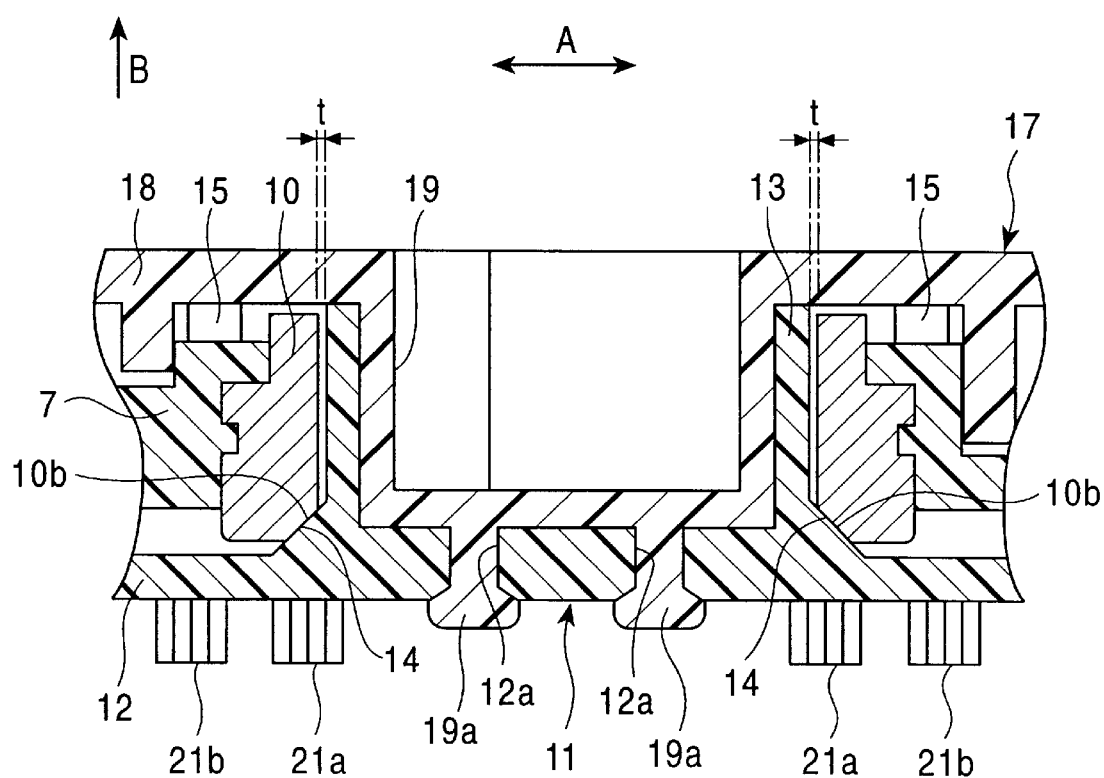
FIG. 3 is an enlarged sectional view of a main portion of the rotary sensor of the present invention.
Figure 10:
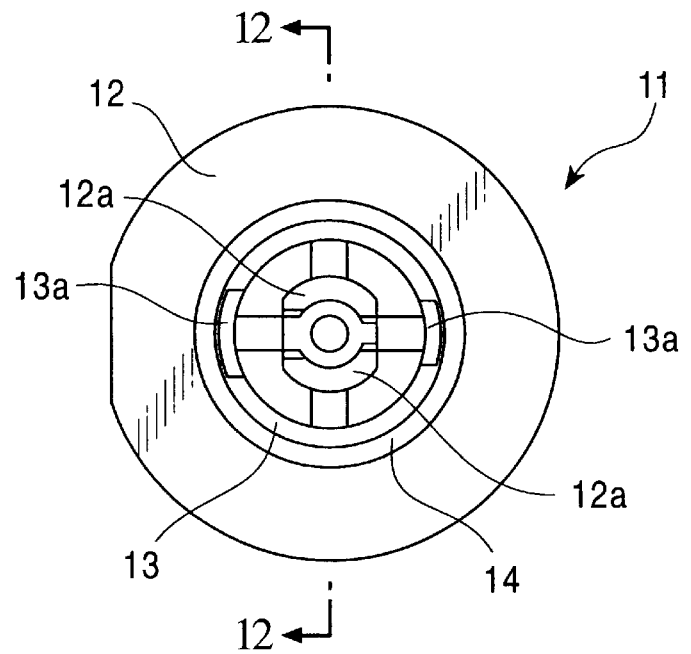
FIG. 10 is a plan view of the rotating member of the rotary sensor of the present invention.
Figure 11:
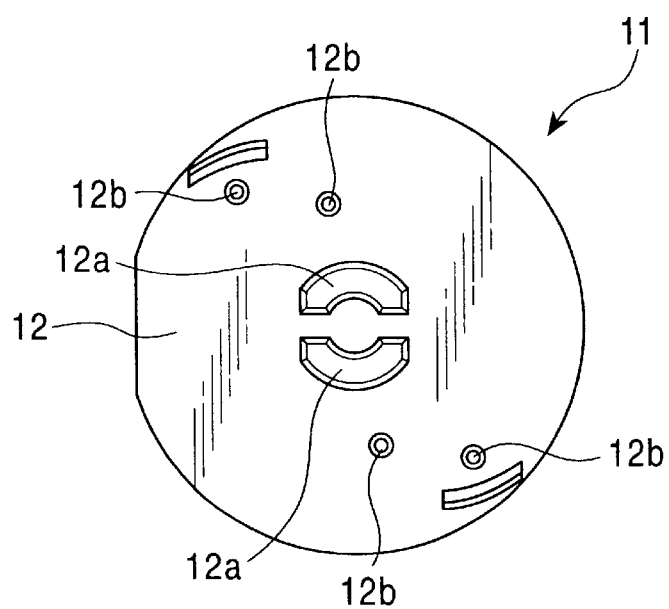
FIG. 11 is a back side view of the rotating member of the rotary sensor of the present invention.
Figure 12:
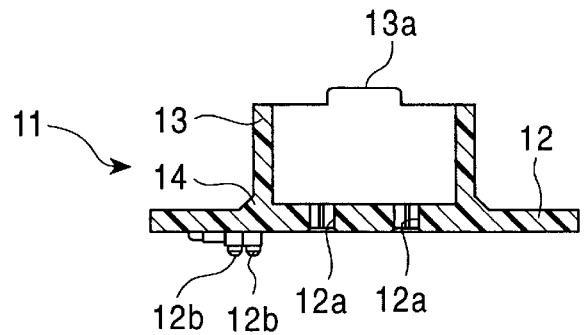
FIG. 12 is a sectional view taken along the line 12—12 of FIG. 10.

The rotating member 11 is formed of an insulating synthetic resin material, such as PBT, and, as shown in FIGS. 10 through 12, has a disc-like mounting plate 12 and a rotation shaft 13 in the form of a hollow cylinder integrally formed at the central portion of the mounting plate 12. In the connection portion between the mounting plate 12 and the rotation shaft 13, there is formed a tapered surface 14 corresponding to the beveled portion 10b of the bearing 10 so as to surround the rotation shaft 13 to form a conical surface. Further, in the mounting plate 12, there are formed two fitting-engagement holes 12a on the inner side of the rotation shaft 13, and on the surface opposite to the rotation shaft 13, there are formed a pair of protrusions 12b, a pair of fitting-engagement protrusions 13a being formed at the forward end of the rotation shaft 13. And, as shown in FIGS. 1 and 3, this rotating member 11 is accommodated in the accommodating portion 5 of the housing 1, and the rotation shaft 13 is inserted into the shaft hole 10a of the bearing 10, with a clearance t being left between the outer peripheral surface of the rotation shaft 13 and the inner peripheral surface of the bearing 10.

Figure 16:
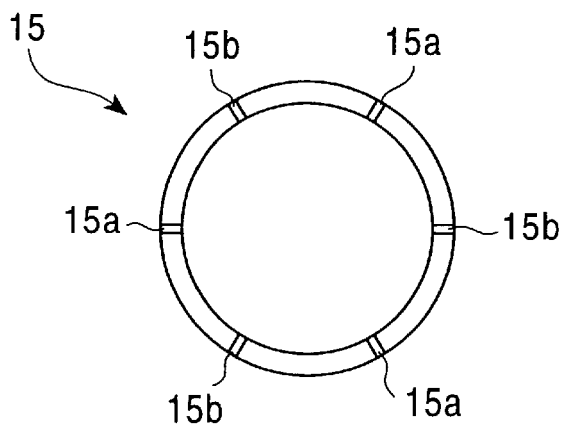
FIG. 16 is a plan view of the wave washer of the rotary sensor of the present invention.
Figure 17:
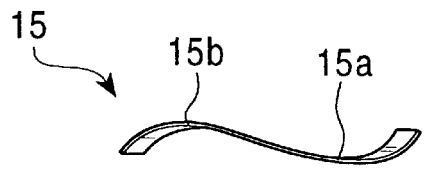
FIG. 17 is a side view of the wave washer of the rotary sensor of the present invention.

The wave washer 15 is formed by performing stamping on a metal plate spring material to obtain a ring-like member, and as shown in FIGS. 16 and 17, recesses 15a and protrusions 15b are alternately formed. And, as shown in FIG. 1, this wave washer 15 is accommodated in the recess 9, with the bearing 10 being inserted into it.

Figure 15:
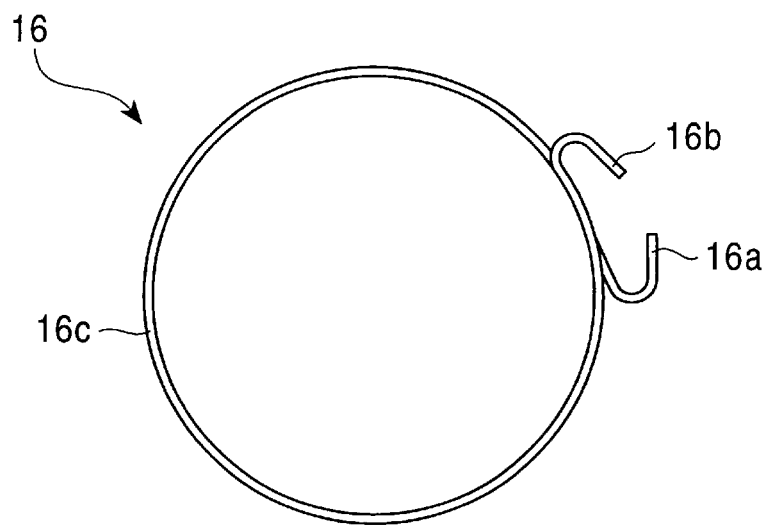
FIG. 15 is a plan view of the coil spring of the rotary sensor of the present invention.

The coil spring 16 consists of a metal wire spring material, and, as shown in FIG. 15, the free end portions are bent to form engagement portions 16a and 16b. And, as shown in FIGS. 1 and 2, this coil spring 16 is accommodated in the recess 9 of the housing 1, with the bearing 10 being accommodated in the winding portion 16c, one engagement portion 16a being engaged with the engagement protrusion 9b of the recess 9.

Figure 18:
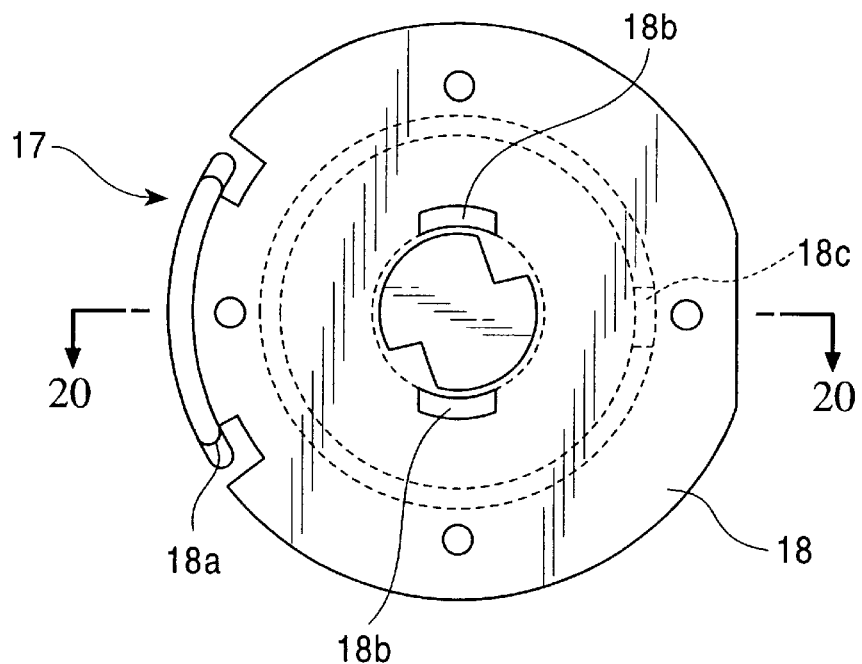
FIG. 18 is a plan view of the lever member of the rotary sensor of the present invention.
Figure 19:
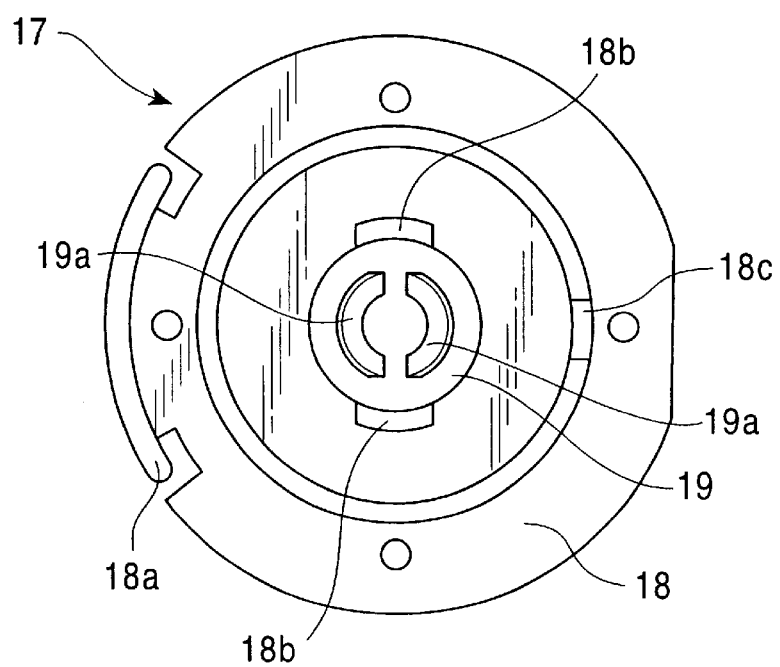
FIG. 19 is a back side view of the lever member of the rotary sensor of the present invention.
Figure 20:
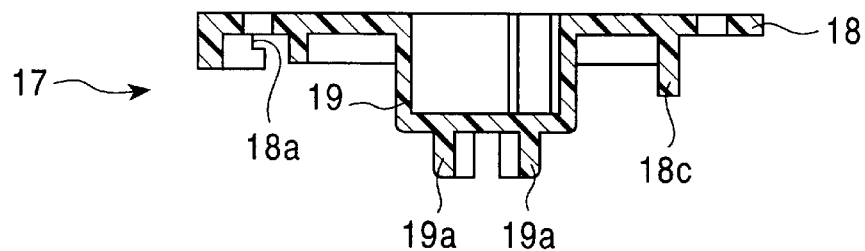
FIG. 20 is a sectional view taken along the line 20—20 of FIG. 18.

The lever member 17 is formed of an insulating synthetic resin material, such as PBT, and, as shown in FIGS. 18 through 20, has a disc-like engagement plate 18 and a connection shaft 19 which is integrally formed at the center of the engagement plate 18 and which is in the form of a hollow cylinder. At the forward end of the connection shaft 19, there are formed two fitting-engagement protrusions 19a. Further, the engagement plate 18 has in its periphery engagement cutouts 18a, and two fitting-engagement holes 18b are opposed to each other on either side of the connection shaft 19, and there is formed a stopper protrusion 18c extending so as to be opposed to the connection shaft 19.

Figure 2:
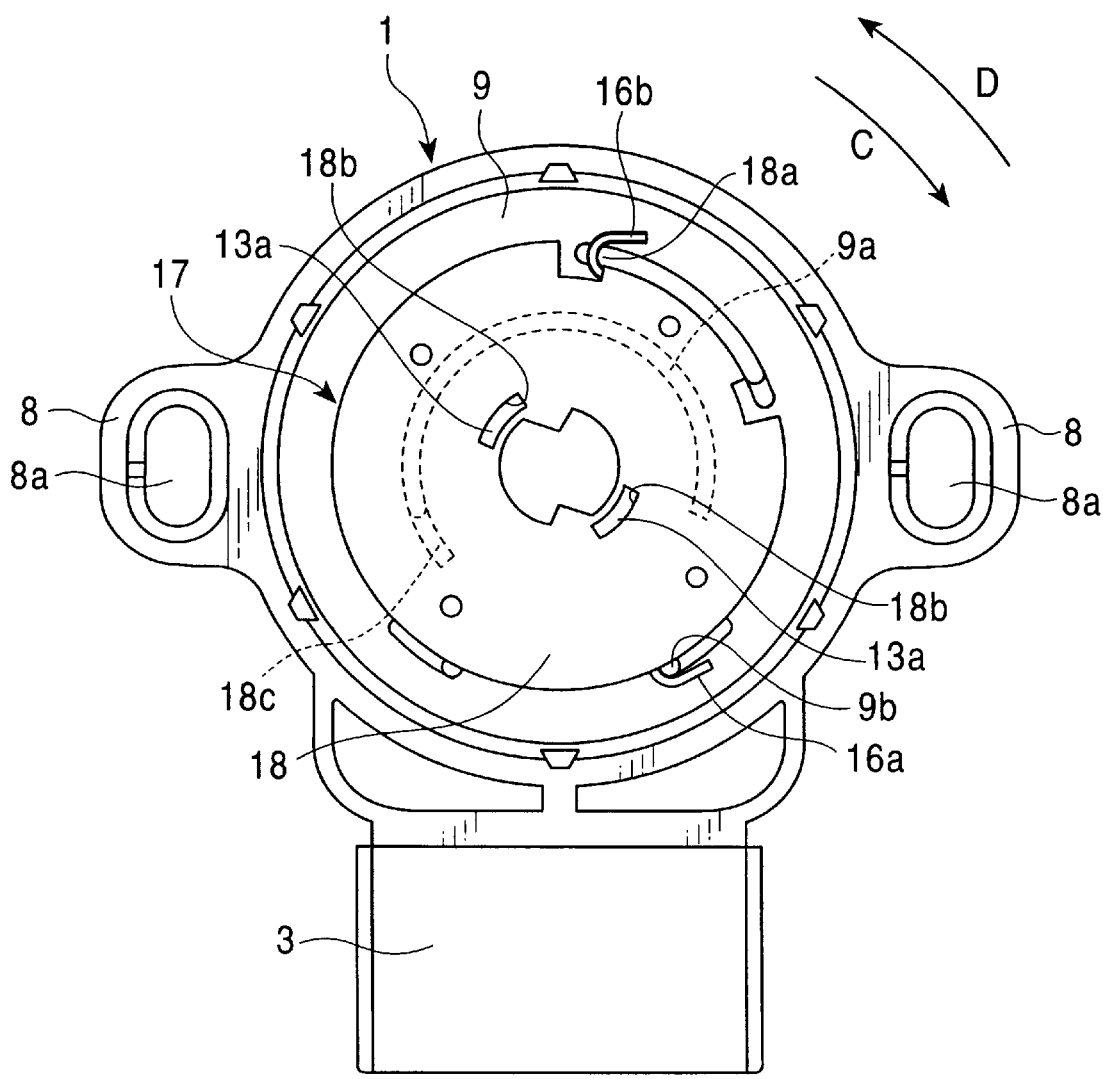
FIG. 2 is a plan view of the rotary sensor of the present invention.

And, as shown in FIGS. 1 and 2, this lever member 17 is connected to the rotating member 11 from the opposite side of the accommodating portion 5, with the connection shaft 19 being fitted into the rotation shaft 13 of the rotating member 11, the fitting-engagement protrusions 19a being fitted into the fitting-engagement holes 12 of the rotating member 11, the fitting-engagement protrusions 13a being fitted into the fitting-engagement holes 18b. The engagement plate 18 is pressurized by the wave washer 15, and the rotation shaft 13 is biased in the thrust direction (the direction of the arrow B) through the lever member 17, and, by this biasing force, the tapered surface 14 of the rotating member 11 is held in press contact with the beveled portion 10b of the bearing 10. Further, the lever member 17 is elastically biased clockwise, with the other engagement portion 16b of the coil spring 16 being engaged with the engagement cutout 18a, whereby the stopper protrusion 18c is engaged with one end portion of the stopper protrusion 9a of the housing 1, and the initial position is maintained.

The rotation detecting means 20 comprises two sliders 21 supported by the mounting plate 12 of the rotating member 11, and a circuit board 22 supported in the accommodating portion 5 of the housing 1 by means of the support plate spring 27, the circuit board 22 being equipped with four terminals 26.

Figure 6:
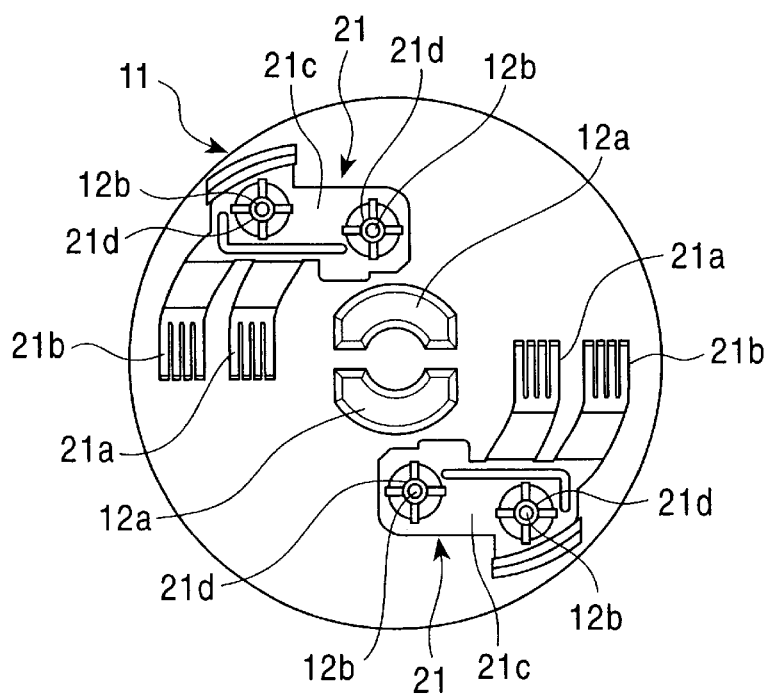
FIG. 6 is a back side view of the rotating member of the rotary sensor of the present invention with sliders mounted thereto.
Figure 13:
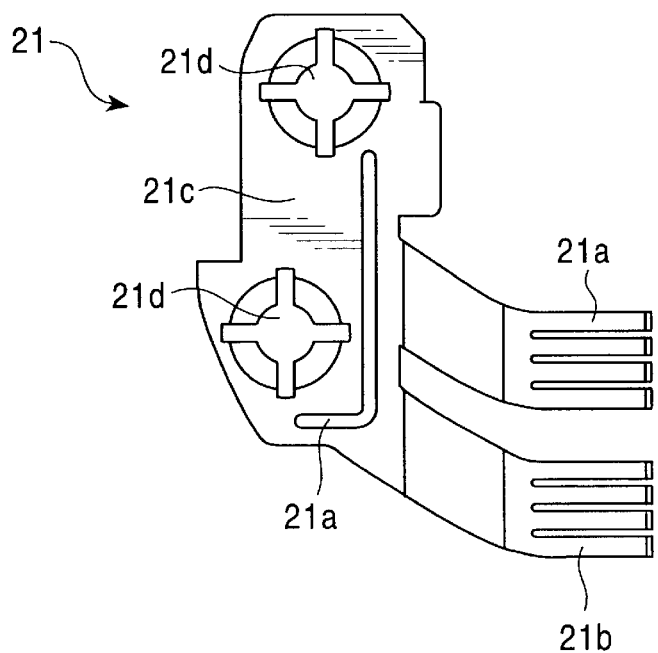
FIG. 13 is a back side view of the sliders of the rotary sensor of the present invention.
Figure 14:
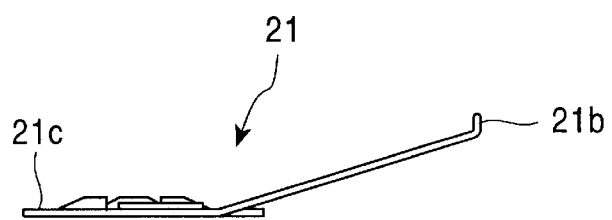
FIG. 14 is a side view of the slider of the rotary sensor of the present invention.

The two sliders 21 are obtained by performing lancing on a thin conductive plate of nickel silver, phosphor bronze or the like, and have the same construction. As shown in FIGS. 13 and 14, it comprises a pair of slider members 21a and 21b, and a substantially rectangular mounting portion 21c integrally connecting them. Mounting holes 21d are formed in the mounting portion 21c, and, between the mounting holes 21d and the slider members 21a and 21b, there is formed a rib 21e protruding on the same side as the bending of the slider members 21a and 21b. And, as shown in FIG. 6, the two sliders 21 are supported by the rotating member 11 by forcing the protrusions 12b into the mounting holes 21d, and, in this condition, they are accommodated in the accommodating portion 5 of the housing 1 (See FIG. 1).

Figure 5:
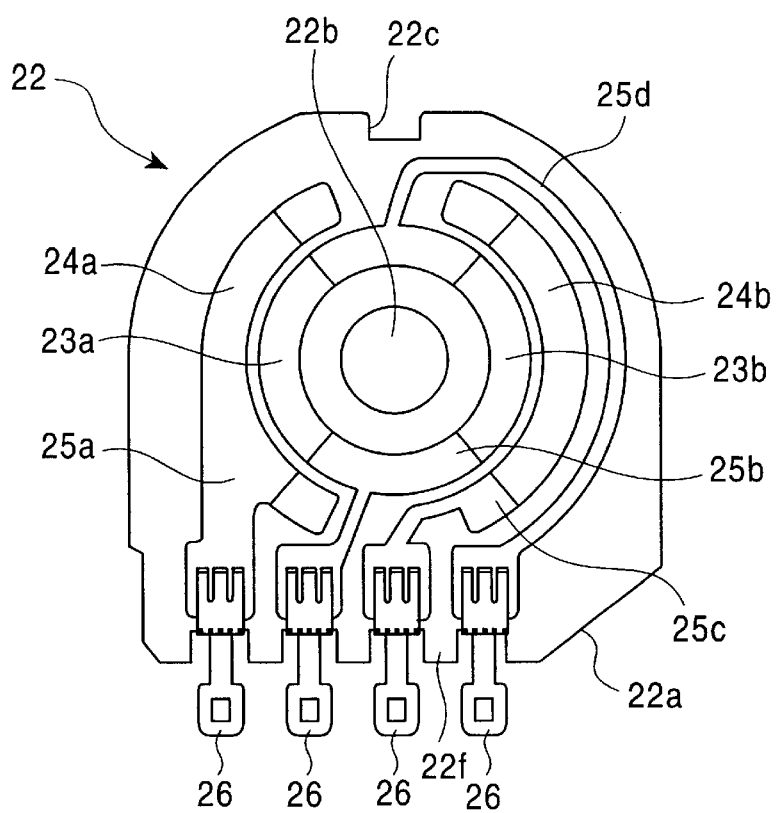
FIG. 5 is a plan view of the circuit board of the rotary sensor of the present invention with terminals mounted thereto.

The circuit board 22 is formed in a rectangular configuration from an insulating material such as ceramic. As shown in FIG. 5, one corner thereof is cut off to form a tapered portion 22a, and a circular hole 22b is formed at the center. Further, an engagement cutout 22c is formed in one side portion, and a protrusion 22d is formed on the other side portion. Further, on the surface of the circuit board 22, resistor patterns 23a and 23b and collector patterns 24a and 24b are concentrically formed by printing around the circular hole 22b, and conductor patterns 25a through 25d adjacent to the resistor patterns 23a and 23b and the collector patterns 24a and 24b extend so as to reach the other side portion, a terminal 26 being connected to each of these conductor patterns 25a through 25d.

Figure 21:
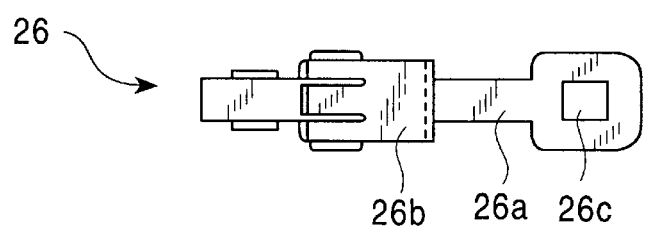
FIG. 21 is a plan view of a terminal of the rotary sensor of the present invention.
Figure 22:
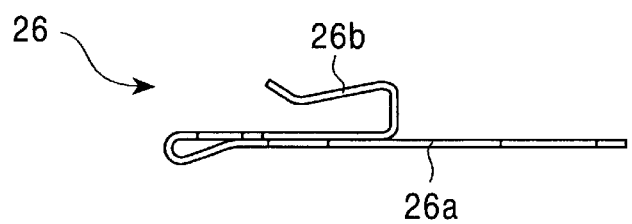
FIG. 22 is a side view of a terminal of the rotary sensor of the present invention.
Figure 23:
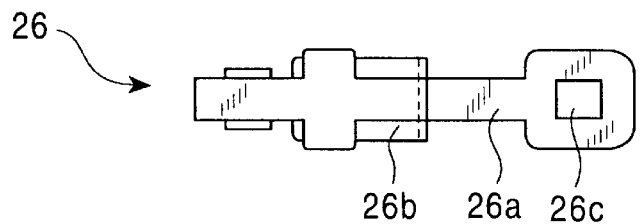
FIG. 23 is a back side view of a terminal of the rotary sensor of the present invention.

The four terminals 26 have the same construction and, as shown in FIGS. 21 and 22, each of them has an elongated base portion 26a consisting of a thin conductor plate, and a clip portion 26b formed by bending one end portion of the base portion 26a in a U-shape, and a hole 26c is formed at the other end of the base portion 26a. The clip portion 26b holds the other side portion of the circuit board 22, whereby it is supported by the circuit board 22, with the terminals being electrically connected to the conductor patterns 25a through 25d.

Figure 4:
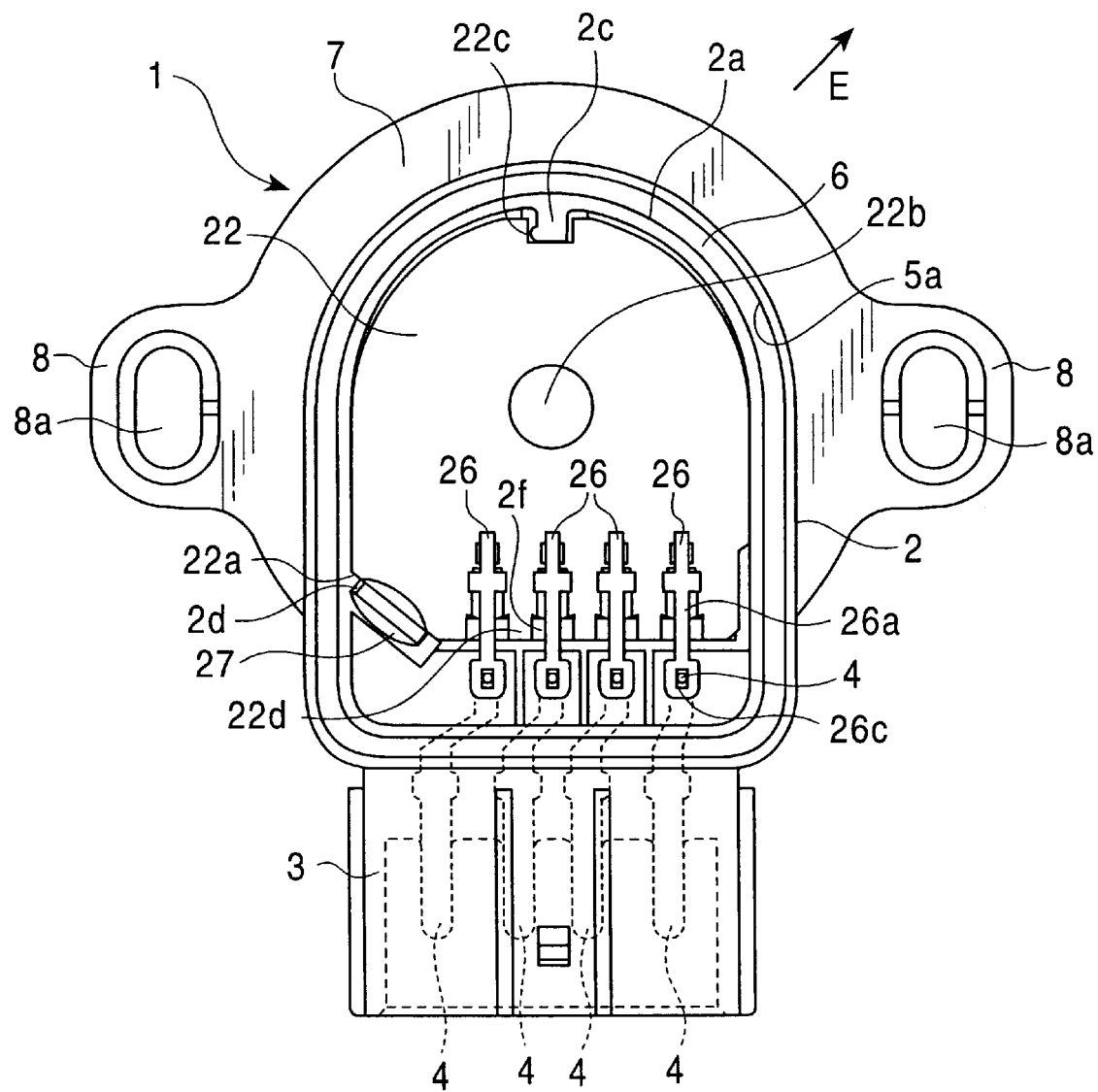
FIG. 4 is a back side view of the rotary sensor of the present invention with its cover removed.
Figure 24:
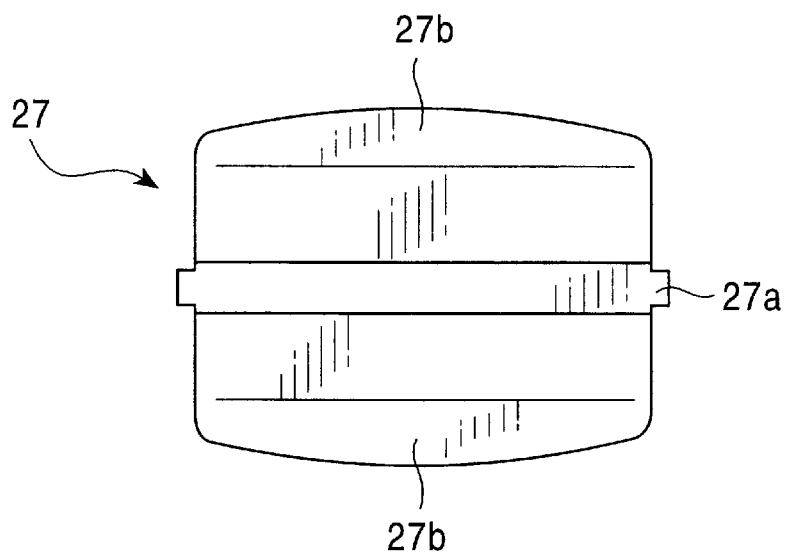
FIG. 24 is a back side view of the support plate spring of the rotary sensor of the present invention.
Figure 25:
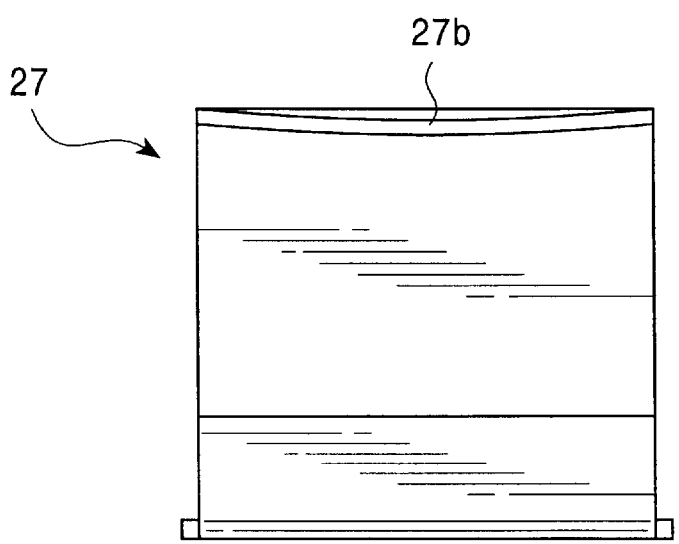
FIG. 25 is a front view of the support plate spring of the rotary sensor of the present invention.
Figure 26:
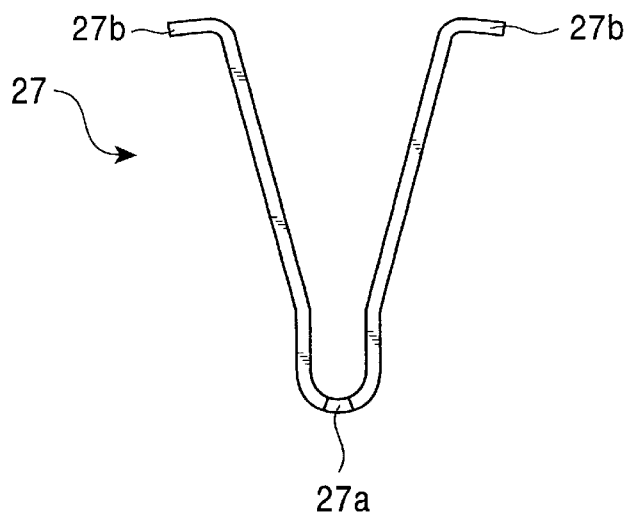
FIG. 26 is a side view of the support plate spring of the rotary sensor of the present invention.

The support plate spring 27 consists of a rectangular thin plate of stainless steel. As shown in FIGS. 24 through 26, it is bent at the central portion 27a into a V-shape, and bent portions 27b are provided at both ends. As shown in FIG. 4, it is inserted into the rectangular hole 2d of the housing 1 starting from the central portion 27a, and accommodated in the accommodating portion 5.

And, as shown in FIGS. 1 and 4, the surface of the circuit board 22 abuts the receiving surface 2b of the housing 1, and the lead-through terminals 4 are inserted into the holes 26c of the terminals 26, and the tapered portion 22a is pressurized in the direction of the arrow E by the plate spring 27, whereby the engagement cutout 22c and the protrusion 20d are engaged with the engagement protrusion 2c and the engagement protrusion 2f, respectively, the circuit board being supported in the accommodating portion 5 of the housing 1. Due to this arrangement, the positioning of the circuit board 22 in the accommodating portion 5 is effected, and the circuit board 22 is opposed to the rotating member 11, with a predetermined gap therebetween, one slider 21 bringing the pair of slider members 21a and 21b into slide contact with the resistor pattern 23a and the collector pattern 24a to establish electrical connection between the resistor pattern 23a and the collector pattern 24a, and the other slider 21 bringing the pair of slider members 21a and 21b into slide contact with the resistor pattern 23b and the collector pattern 24b to establish electrical connection between the resistor pattern 23b and the collector pattern 24b.

Figure 27:
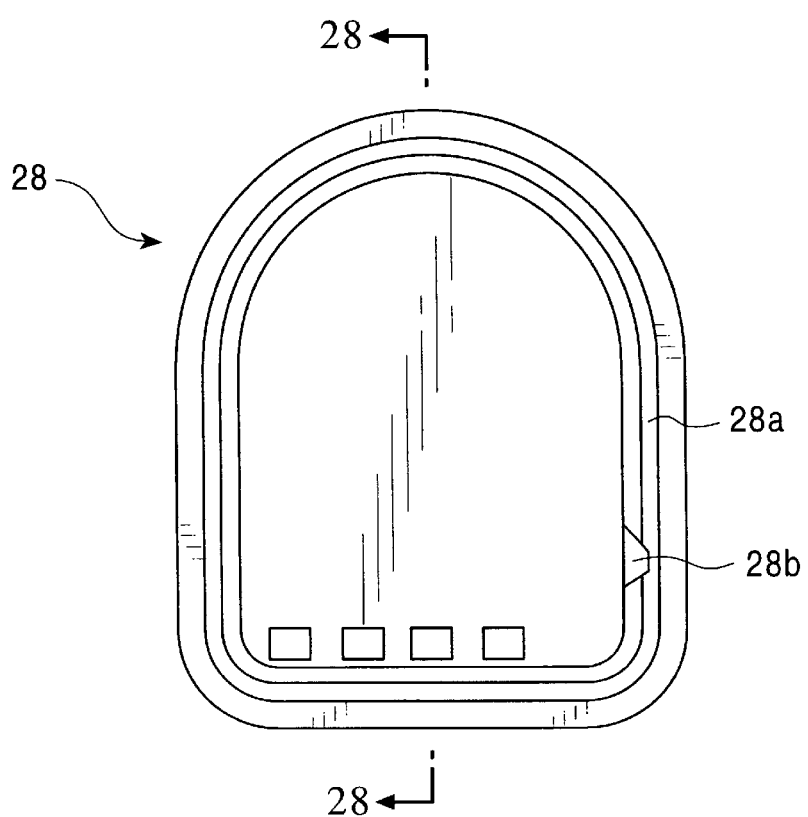
FIG. 27 is a plan view of the cover of the rotary sensor of the present invention.
Figure 28:
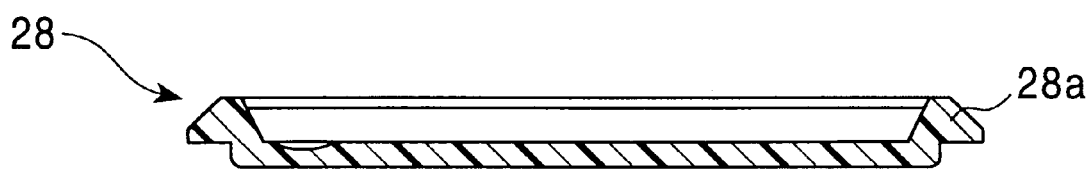
FIG. 28 is a sectional view taken along the line 28—28 of FIG. 27.
Figure 29:
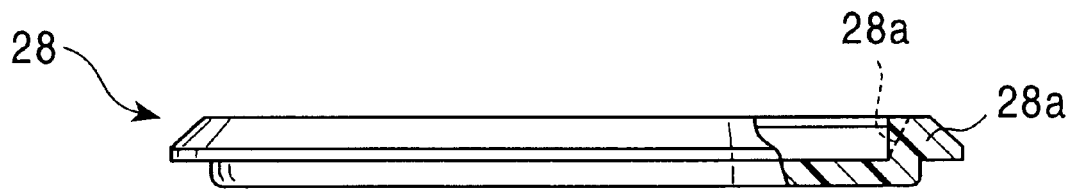
FIG. 29 is a partial sectional view of the cover of the rotary sensor of the present invention.
Figure 30:
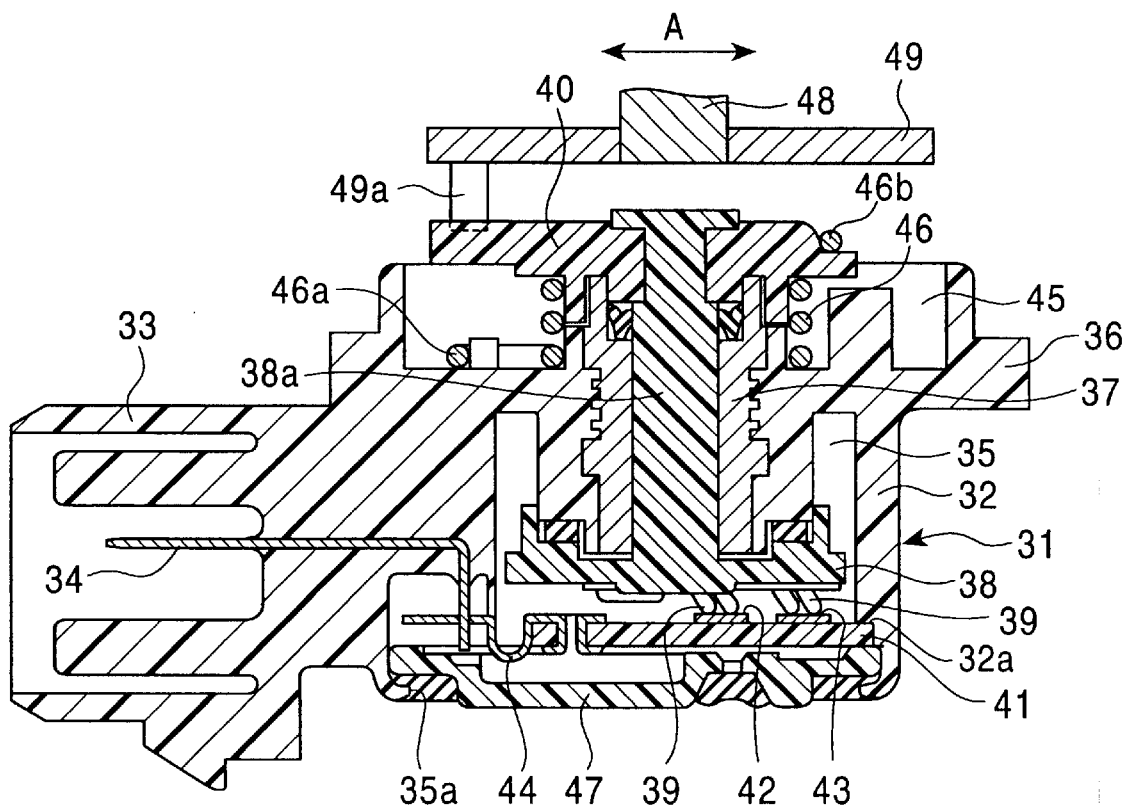
FIG. 30 is a sectional view of a conventional rotary sensor.
Figure 31:
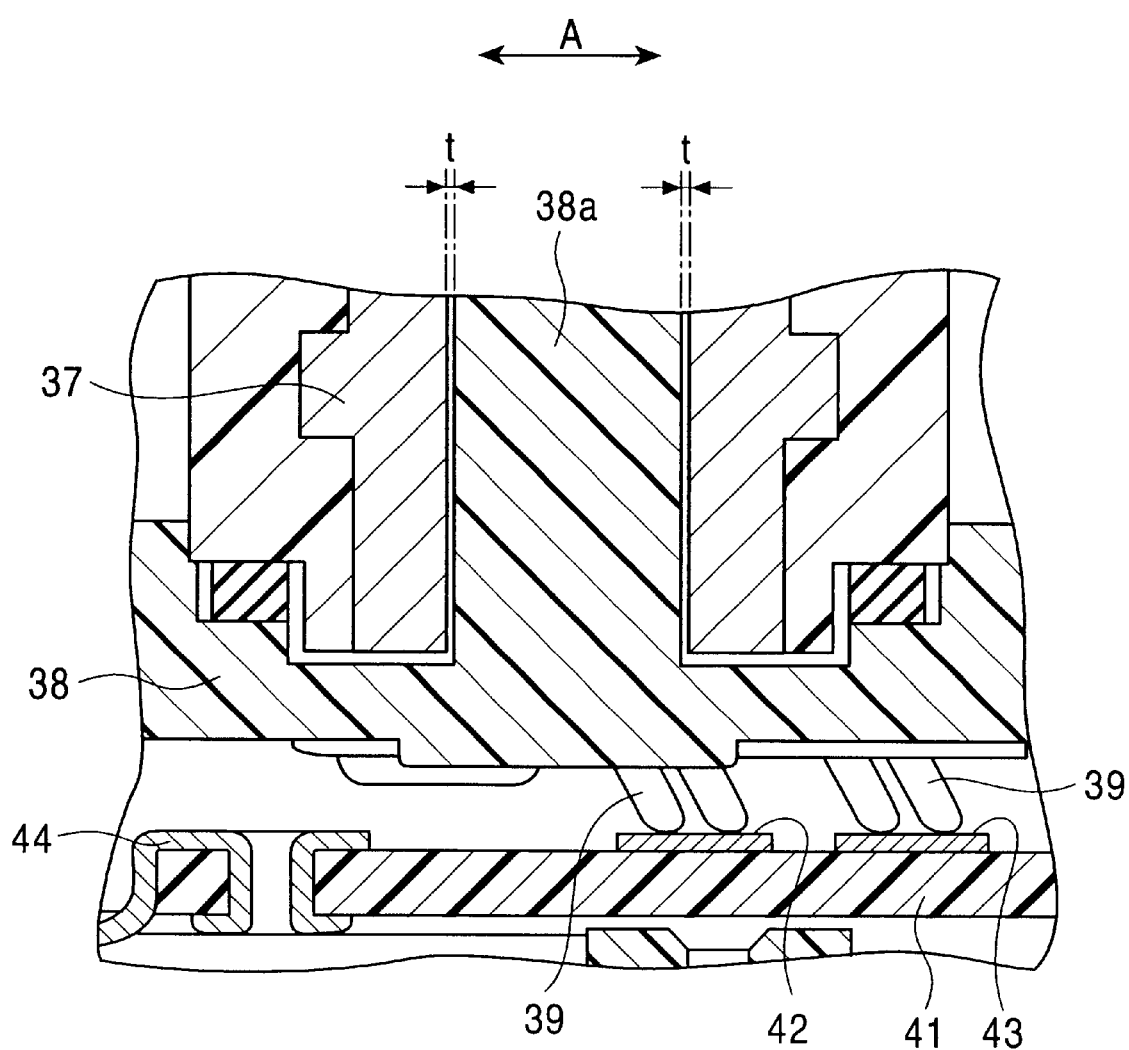
FIG. 31 is an enlarged sectional view of a main portion of the conventional rotary sensor.

The cover 28 is formed as a flat plate from an insulating resin material, such as PBT, and, as shown in FIGS. 27 through 29, an annular protrusion 28a is provided in, the periphery thereof, a cutout recess 28b being formed in the annular protrusion 28a. And, as shown in FIG. 1, this cover 28 is accommodated in the accommodating portion 5 of the housing 1 to close the opening 5a and fastened to the housing 1 by caulking by means of the crushed portion 2e formed in the periphery of the opening 5a by heat caulking, the annular protrusion 28a compressing the O-ring 6 placed on the annular step portion 28a to enclose the accommodating portion 5, and the cutout recess 28b abutting the bent portion 27b of the support plate spring 27 to hold the support plate spring 27 in the accommodating portion 5 so that it will not be detached from the rectangular hole 2d.

Next, the process for assembling the rotary sensor, constructed as described above, will be described. First, the bearing 10 is passed through the wave washer 15 and accommodated and placed in the recess 9. Next, the bearing 10 is inserted into the winding portion 16c to accommodate the coil spring 16 in the recess 9, one engagement portion 16a being engaged with the engagement protrusion 9b. Next, the connection shaft 19 of the lever member 17 is inserted into the shaft hole 10a of the bearing 10, and, with the wave washer 15 and the coil spring 16 being pressed by the engagement plate 18 so that they may not be detached from the recess 9, the housing 1 is placed upside down, and the fitting-engagement protrusion 13a is caused to face the fitting-engagement hole 18b, the rotation shaft 13 being inserted into the shaft hole 10a while fitting the connection shaft 19 into the rotation shaft 13. Then, the fitting-engagement protrusion 13a is engaged with the fitting-engagement hole 18b, and fitting-engagement protrusion 19a is fitted into the fitting-engagement hole 12a, the lever member 17 being connected with the rotation shaft 13 to form an integral unit with the rotating member 11.

Next, the housing 1 is turned over to be brought to the former position, and the other engagement portion 16b of the coil spring 16 is engaged with the engagement cutout 18a of the lever member 17, and, while winding the coil spring 16, the stopper protrusion 18c of the lever member 17 is engaged with the stopper protrusion 9a of the housing 1. Next, the housing 1 is turned over again, and the protrusion 12b is forced into the mounting hole 21d to mount the two sliders 21 to the rotating member 11, and the O-ring 6 is placed on the annular step portion 2a. Then, the surface of which the resistor patterns 23a and 23b and the collector patterns 24a and 24b are formed is directed toward the slider 21 side, and the lead-through terminals 4 are inserted into the holes 26c of the terminals 26, the circuit board 22 being placed on the receiving surface 2a of the housing 1.

Next, soldering is conducted on the terminals 26 and the lead-through terminals 4 to connect them together, and the cover 28 is accommodated in the accommodating portion 5, with the annular protrusion 28a facing the O-ring 6. After this, in this condition, the periphery of the opening 5a of the housing 1 is inwardly crushed by heat caulking to form the crushed portion 2e, and the cover 28 is fastened by caulking by this crushed portion 2e to fix it to the housing 1.

In this way, the assembly of the rotary sensor is completed. After the assembly, as shown in FIG. 3, the rotation shaft 13 is supported in the shaft hole 10a of the bearing 10, and a clearance t is left between the outer peripheral surface of the rotation shaft 13 and the inner peripheral surface of the shaft hole 10a of the bearing 10. Further, in the radial direction (the direction of the arrow A) of the shaft hole 10a, on the outer side of the beveled portion 10b and the tapered surface 14, the wave washer 15 biases the engagement plate 18 of the lever member 17 such that it is separated from the accommodating portion 5 (the direction of the arrow B), whereby the rotating member 11 can integrally rotate with the lever 17, with the tapered surface 14 of the rotating member 11 and the beveled portion 10b of the bearing 10 being in press contact with each other in the accommodating portion 5.

Further, as shown in FIG. 1, the engagement plate 18 of the lever member 17 faces the recess 9, and the coil spring 16 slightly pressurizes the engagement plate 18 of the lever member 17 in the thrust direction (the direction of the arrow B) to assist the pressurization of the engagement plate 18 by the wave washer 15. Further, a torque which acts against the elastic force of the coil spring 16 is imparted to the lever member 17, and the torque is canceled after rotating the lever member 17 counterclockwise (the direction of the arrow D in FIG. 2), whereby, due to the elastic force of the coil spring 16, the lever member 17 is automatically restored integrally with the rotating member 11 to the initial position (the state shown in FIG. 2), in which the stopper protrusions are engaged with each other.

In the rotary sensor, constructed and assembled as described above, the end portion of the drive shaft 29, which rotates by a predetermined angle in accordance with the change in the position or opening angle of the throttle valve (not shown) of an internal combustion engine, is fitted into the connection shaft 19 of the lever member 17 as shown in FIG. 1, and a predetermined voltage is applied to both end portions of the resistor patterns 23a and 23b through a connector (not shown) fitted into the external connection portion 3, the lead-through terminals 4 and the terminals 26.

And, when the drive shaft 29 rotates, the rotation shaft 13 and the rotating member 11 rotate counterclockwise (the direction of the arrow D in FIG. 2) integrally with the lever 17 against the elastic force of the coil spring 16, and, with that, one slider 21 slides on the resistor pattern 23a and the conductor pattern 24a, and the other slider 21 slides on the resistor pattern 23b and the conductor pattern 24b. As a result, a voltage corresponding to the position or opening angle of the throttle valve is generated at the two terminals 26 connected to the conductor patterns 25a and 25c adjacent to the collector patterns 24a and 24b. This voltage is supplied to the exterior of the sensor through the lead-through terminals 4 and the connector and used as a throttle valve position signal to control an internal combustion engine or the like.

During the rotation of the rotation shaft 13, the rotation shaft 13 is biased in the thrust direction (the direction of the arrow B) by the wave washer 15 through the lever member 17, and the tapered surface 14 of the rotating member 11 is pressed against the beveled portion 10b of the bearing 10 to be held in surface contact therewith, so that there is no fear that the tapered surface 14 will be deviated from the predetermined rotation path along the beveled portion 10b around the shaft hole 10a. Thus, the rotatior center of the rotating member 11 does not become eccentric, and it is possible to restrain the eccentricity of the rotation shaft 13 in the radial direction of the shaft hole 10a, and, as shown in FIG. 3, the rotation shaft can rotate in a stable manner, maintaining the clearance t.

As a result, the path of movement of the slider member 21a is circular, and it is possible to improve the linearity characteristics of the throttle valve position signal (linear change in the output voltage corresponding to the rotation of the lever member 17), eliminating the hysteresis of the throttle valve position signal and making it possible to correctly detect changes in the position or opening angle of the throttle valve.

While in this embodiment the wave washer 15 is used as the biasing means for imparting the biasing force in the thrust direction to the rotation shaft 13, this should not be construed restrictively. It is also possible to enhance the spring force of the coil spring 16 used to assist the wave washer 15, and to bias the rotation shaft 13 in the thrust direction solely by the coil spring 16. In that case, the wave washer 15 is not needed, whereby it is possible to reduce the number of parts of the rotary sensor.

Further, while in this embodiment the housing 1 is formed by integrally forming the annular wall portion 2 and the bottom wall portion 7, and the housing 1 and the cover 28 are formed as separate components, this should not be construed restrictively. It is also possible to integrally form the annular wall portion 2 and the cover 28 to form the housing 1, and to form the bottom wall portion 7 and the housing 1 as separate components. Further, while in the rotating member 11 the mounting plate 12 and the rotation shaft 13 are integrally formed, it is also possible to form the mounting plate 12 and the rotation shaft 13 as separate components, firmly attaching the rotation shaft 13 to the mounting plate 12 to form them into an integral unit.

The present invention, an embodiment of which has been described, provides the following advantages.

There is provided, in accordance with the present invention, a rotary sensor comprising a rotating member having a rotation shaft, rotation detecting means for detecting the rotation of the rotating member, a bearing having a shaft hole into which the rotation shaft is inserted and which rotatably supports the rotation shaft integrally with the rotating member, and biasing means for imparting a biasing force in a thrust direction to the rotation shaft, wherein there is formed in the periphery of one end portion of the shaft hole a beveled portion inclined so as to be outwardly flared in the radial direction of the shaft hole, and wherein the rotating member is provided with a tapered surface corresponding to the beveled portion, the tapered surface being held in press contact with the beveled portion by the biasing force, whereby there is no fear that the tapered surface will be deviated from the predetermined rotation path along the beveled portion around the shaft hole, thereby preventing radial eccentricity of the rotation shaft and making it possible to provide a highly reliable rotary sensor capable of performing correct detection.

Further, there are provided a housing having an accommodating portion accommodating the rotation detecting means and a lever member adapted to rotate integrally with the rotation shaft, the bearing being provided in the bottom wall portion of the housing, the accommodating portion communicating with the exterior of the housing by the bearing, the lever member being arranged on the opposite side of the accommodating portion, the bottom wall portion having a recess accommodating the biasing means on the opposite side of the accommodating portion, the biasing means biasing the rotation shaft through the lever member, whereby it is possible to effect overlapping of the bearing and the biasing means in the thrust direction of the rotation shaft, so that, due to the proximity of the biasing means to the tapered surface and the beveled portion, an eccentric load is not easily applied to the press contact portion of the tapered surface and the beveled portion to make it possible to achieve a stable surface contact and, at the same time, it is possible to make the rotary sensor flat and reduce it in size.

Further, the rotating member is accommodated in the accommodating portion, and wherein, in the radial direction of the hole portion, on the outside of the beveled portion of the bearing and the tapered surface of the rotating member, the biasing means biases the lever member such that it is separated from the accommodating portion, thereby bringing the beveled portion into press contact with the tapered surface in the accommodating portion, whereby it is possible to make the rotation shaft parallel with respect to the inner peripheral surface of the shaft hole and to reliably bring the beveled portion into surface contact with the tapered surface with a uniform load, thereby reliably preventing radial eccentricity of the rotation shaft and rotating the rotation shaft in a more stable manner.

Further, the biasing means is formed by a single coil spring, the bearing being accommodated in the winding portion of the coil spring, whereby it is possible to reliably prevent radial eccentricity of the rotation shaft and rotate the rotation shaft in a more stable manner without involving an increase in the number of parts of the rotary sensor.

Further, the free ends of the coil spring are engaged with the recess and the lever member, the lever member being automatically restored to the initial position with the rotating member by the elastic force of the coil spring, whereby it is possible to effect the biasing of the rotation shaft in the thrust direction and the restoration of the lever member to the initial position with the single coil spring, thereby reducing the number of parts of the rotary sensor.

What is claimed is:

1. A rotary sensor comprising:
    a rotating member having a rotation shaft;
    a rotation detector to detect rotation of the rotating member;
    a bearing having a shaft hole into which the rotation shaft is inserted and which rotatably supports the rotation shaft integrally with the rotating member;
    a housing having an accommodating portion accommodating the rotation detector, the bearing provided in a bottom wall portion of the housing, the accommodating portion communicating with an exterior of the housing by the bearing;
    a lever member that rotates integrally with the rotation shaft and is arranged on an opposite side of the accommodating portion; and
    a biasing mechanism to impart a biasing force in a thrust direction to the rotation shaft and biasing the rotation shaft through the lever member, wherein there is formed in a periphery of one end portion of the shaft hole a beveled portion inclined to be outwardly flared in a radial direction of the shaft hole, the rotating member is provided with a tapered surface corresponding to the beveled portion, the tapered surface being held in press contact with the beveled portion by the biasing force, and the bottom wall portion has a recess accommodating the biasing mechanism on the opposite side of the accommodating portion.

2. A rotary sensor according to claim 1, wherein the rotating member is accommodated in the accommodating portion, and wherein, in a radial direction of the hole portion, on an outside of the beveled portion of the bearing and the tapered surface of the rotating member, the biasing mechanism biases the lever member such that it is separated from the accommodating portion, thereby bringing the beveled portion into press contact with the tapered surface in the accommodating portion.

3. A rotary sensor according to claim 2, wherein the biasing mechanism is a single coil spring, the bearing being accommodated in a winding portion of the coil spring.

4. A rotary sensor according to claim 3, wherein free ends of the coil spring are engaged with the recess and the lever member, the lever member being automatically restored to an initial position with the rotating member by an elastic force of the coil spring.

5. A rotary sensor comprising:

a rotating member having a rotation shaft;

a rotation detector to detect rotation of the rotating member;

a housing having a bottom wall portion with a first surface at one side and a second surface at another side and having an accommodating portion accommodating the rotation detector;

a bearing provided on the bottom wall portion, the bearing extending through the accommodating portion to the outside of the housing and having a shaft hole into which the rotation shaft is inserted and which rotatably supports the rotation shaft integrally with the rotating member; and a biasing mechanism disposed between the first surface of the bottom wall portion and the rotating member to impart a biasing force in a thrust direction to the rotation shaft, wherein the bearing includes a beveled portion at one end of the bearing at the same side as the second surface of the bottom wall portion, the beveled portion being inclined to be outwardly flared in a radial direction of the shaft hole toward a periphery of the bearing at the one end thereof, and being linear in a vertical cross-section, and the rotating member is provided with a tapered surface which is in surface contact with the beveled portion and which is held in press contact with the beveled portion by the biasing force, and the biasing mechanism is in contact with the bottom wall portion at a periphery of the beveled portion of the bearing and the tapered surface of the rotating member in a radial direction of the shaft hole.

6. A rotary sensor according to claim 5, wherein the tapered surface is longer than the beveled portion and a midsection of the tapered surface is held in press contact with the beveled portion.

* * * * *

UNITED STATES PATENT AND TRADEMARK OFFICE
CERTIFICATE OF CORRECTION

PATENT NO.    : 6,731,194 B1
DATED         : May 4, 2004
INVENTOR(S)   : Hideki Abe It is certified that error appears in the above-identified patent and that said Letters Patent is hereby corrected as shown below:

<u>Title page,</u>
Item [*] Notice, should read -- Subject to any disclaimer, the term of this patent is extended or adjusted under 35 U.S.C. 154(b) by (149) days. --

Signed and Sealed this

Twenty-eighth Day of June, 2005

JON W. DUDAS
*Director of the United States Patent and Trademark Office*